US006115664A

United States Patent [19]

Cullen et al.

[11] Patent Number: 6,115,664

[45] Date of Patent: Sep. 5, 2000

[54] METHOD OF ESTIMATING ENGINE CHARGE

[75] Inventors: Michael John Cullen, Northville; Giuseppe D. Suffredini, Shelby Township, both of Mich.

[73] Assignee: Ford Global Technologies, Inc., Dearborn, Mich.

[21] Appl. No.: 09/232,297

[22] Filed: Jan. 15, 1999

[51] Int. Cl.[7] .............................. G01F 1/86; F02D 41/18

[52] U.S. Cl. ......................... 701/102; 73/117.3; 73/118.2

[58] Field of Search ..................................... 701/102, 108; 73/116, 117.3, 118.2; 123/406.49, 478, 480, 494

[56] References Cited

U.S. PATENT DOCUMENTS

| | | | |
|---|---|---|---|
| 3,969,614 | 7/1976 | Moyer et al. | 701/103 |
| 4,142,495 | 3/1979 | Lahiff | 123/676 |
| 4,433,666 | 2/1984 | Masaki et al. | 123/568.22 |
| 4,928,654 | 5/1990 | Hosaka | 123/486 |
| 5,205,260 | 4/1993 | Takahashi et al. | 123/494 |
| 5,209,212 | 5/1993 | Viess et al. | 123/568.16 |
| 5,537,977 | 7/1996 | Hartman et al. | 123/406.46 |
| 5,546,915 | 8/1996 | Isobe | 123/568.12 |
| 5,621,167 | 4/1997 | Fang-Cheng | 73/118.1 |
| 5,974,870 | 11/1999 | Treinies et al. | 73/118.2 |

*Primary Examiner*—Andrew M. Dolinar

[57] ABSTRACT

Method of estimating the total charge to cylinders (123) of an internal combustion (105) engine where the total charge comprises the sum of the air charge and the EGR charge. The total charge is estimated by determining a linear total charge versus MAP reference function at selected engine speeds and at a preselected reference (stored) barometric pressure, reference (stored) engine coolant temperature, and reference (stored) manifold air charge temperature and determining a current barometric pressure value, a current engine coolant temperature value, and a current intake manifold air charge temperature. An intercept of the total charge versus MAP reference function with an total charge axis (e.g. Y-axis intercept) is adjusted for current barometric pressure different from the reference barometric pressure, and the slope of the total air charge versus MAP reference function is adjusted for current engine coolant temperature and current manifold air charge temperature different from the reference engine coolant temperature value and the reference manifold air charge temperature value. An adjusted total charge is determined by engine control logic based on the adjusted intercept and the adjusted slope of the function. An estimated EGR charge can be subtracted the adjusted total charge to estimate air mass flow rate entering the engine cylinders.

9 Claims, 2 Drawing Sheets

METHOD OF ESTIMATING ENGINE CHARGE

BACKGROUND OF THE INVENTION

1. Field of the Invention

The present invention relates to a method and system for estimating total charge and air charge entering the cylinders of an internal combustion engine.

2. Description of Related Art

The mass of air, or cylinder air charge, inducted into each cylinder of an internal combustion engine must be known as precisely as possible in order to match the air mass with an appropriate mass of metered fuel. One technique involves placement of a manifold absolute pressure sensor in the intake manifold. An estimation algorithm treats the manifold absolute pressure (MAP) as an input and uses mapped engine data and engine speed to estimate air flow into the engine cylinders. For the MAP based system, gases other than air, such as intentionally introduced exhaust gas known as exhaust gas recirculation (EGR), increase the manifold pressure and should not be matched by metered fuel. However, the MAP sensor cannot distinguish between fresh air charge and EGR charge.

An object of the present invention is to provide a method and system for estimating total charge as well as air charge to cylinders of an internal combustion engine using a total charge versus MAP function that embodies air charge and EGR charge.

SUMMARY OF THE INVENTION

An embodiment of the present invention involves estimating a total charge entering the cylinders of an internal combustion engine where the total charge comprises the sum of the intake air charge and the EGR charge. The total charge is estimated by determining a linear total charge versus MAP reference function at various engine speeds and a preselected reference (stored) barometric pressure, reference (stored) engine coolant temperature, and reference (stored) manifold air charge temperature and determining a current barometric pressure value, a current engine coolant temperature value, and a current intake manifold air charge temperature. An intercept of the total charge versus MAP reference function with a total charge axis (e.g. Y-axis intercept) is adjusted for current barometric pressure different from the reference barometric pressure, and the slope of the total charge versus MAP reference function is adjusted for current engine coolant temperature and current manifold air charge temperature different from the reference engine coolant temperature value and the reference manifold air charge temperature value. An adjusted total charge is determined by engine control logic based on the adjusted intercept and the adjusted slope of the total charge versus MAP function and is used to determine air charge to the cylinders.

DETAILED DESCRIPTION OF THE PREFERRED EMBODIMENT

Figure 1:
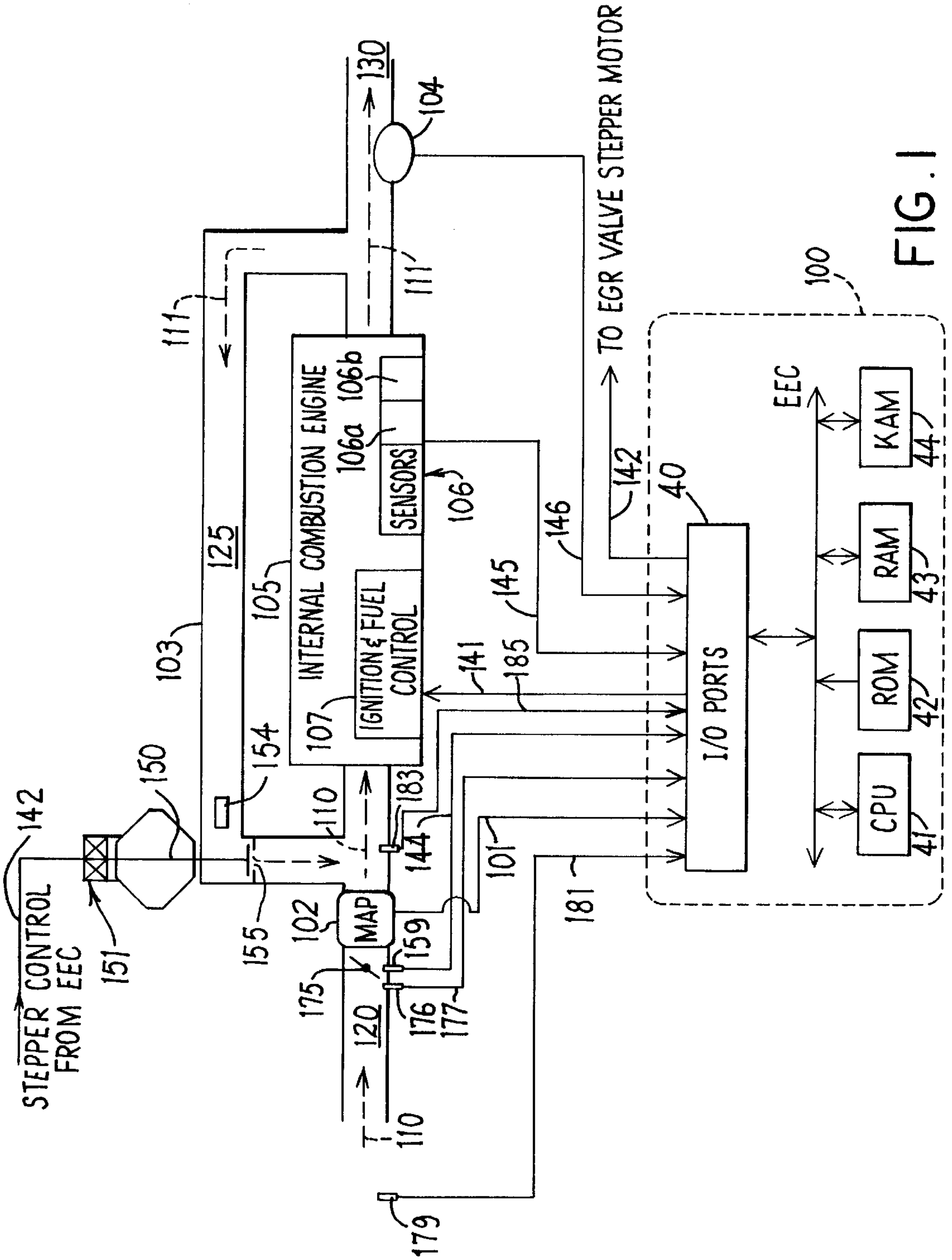
FIG. 1 is block diagram of a portion of an internal combustion engine and electronic engine controller which embodies principles of the invention.

FIG. 1 illustrates an internal combustion engine 105 whose operation is controlled by Electronic Engine Controller (EEC) 100, which includes a central processing unit 41 (CPU), a read-only memory (ROM) 42 for storing control programs, a random-access memory (RAM) 43 for temporary data storage, a keep-alive memory (KAM) 44 for storing learned values, conventional data bus and I/O ports 40 for transmitting and receiving signals to and from the engine. EEC 100 receives signals from a plurality of sensors generally designated 106, including but not limited to, an engine speed sensor and engine circulating coolant temperature sensor designated schematically at 106*a* and 106*b*, which transmit signals containing information indicative of the rotational speed of the engine, the temperature of the engine coolant circulating in the engine, and other engine operating parameters to EEC 100 over respective signal lines designated generally as 145. Each of the sensors 106 is conventional and may take one of several known forms. EEC 100 receives signals 145 along with other signals such as 144 and 146 described below and generates control signals for controlling spark timing, the rate of fuel delivered to engine combustion chambers and other operational functions of the engine. For example, engine 105 draws an intake air mixture into intake manifold 120 past a manifold absolute pressure (MAP) sensor 102 which transmits a signal 101 indicative of MAP to EEC 100. A conventional swirl control valve 112 also known as a secondary valve is positioned in each intake manifold runner 120*a* proximate each intake valve 121 to cylinder 123, which also has an exhaust valve 125 associated therewith in conventional manner. The swirl control valve 112 typically is operable by actuator 113 communicated to engine vacuum to pivot about pivot axis 112*a* in manifold runner 120*a* between a full open state (solid line) and a closed state (dashed line) to impart high swirling motion to the air charge entering each cylinder. This swirling motion continues through the induction, compression, and expansion stroke of the engine and promotes fast burn combustion, thereby improving fuel economy and emissions. A throttle position sensor 159 senses the angular position of throttle lever 175 and transmits a throttle position signal 144 indicative of the angular position of throttle lever 175 to EEC 100. Dotted line 110 indicates the flow of the intake charge air entering the intake manifold 120. An air temperature sensor 176 can be used to detect the temperature of the air charge entering intake manifold 120 and transmits a representative signal 177 to EEC 100. Ambient air temperature sensor 179 can be disposed outside the engine air cleaner assembly (not shown) and senses ambient temperature and transmits a representative signal 181 to EEC 100. Manifold charge temperature sensor 183 can be disposed in manifold 130 and senses manifold charge temperature, which can be include air and EGR gas, between the engine throttle plate and intake valves and transmits signal 185 to EEC 100. Sensors 102, 159, 176, 179, and 183 are each conventional.

Exhaust gas generated from the combustion of an air/fuel mixture within the engine combustion chambers travels from the combustion chambers through exhaust manifold 130 as indicated by dotted lines 111. A heated exhaust gas oxygen sensor (HEGO) 104 detects the oxygen content within the exhaust gas and transmits a representative signal 146 to EEC 100.

The engine includes an exhaust gas recirculation (EGR) system for transporting a controlled portion of exhaust gas generated by the engine from an exhaust manifold 130 into the intake manifold 120 via an EGR conduit or passage 125. The amount of exhaust gas which is recirculated from the exhaust manifold to the intake manifold is controlled by a conventional DC stepper motor driven EGR valve 150 having a stepper motor 151 that receives signals 142 from EEC 100 to axially move the valve 150 in incremental steps in a manner to control its position relative to a flow orifice 155 communicating to intake manifold 120. The EGR passage 125 may include an exhaust gas temperature sensor 154 for providing to EEC 100 a signal representative of the temperature of the exhaust gas at (e.g. slightly upstream of) EGR valve 150. Alternately, the exhaust gas temperature may be inferred empirically by EEC 100 from engine speed, air charge, ignition timing, and air/fuel ratio.

Control of the EGR system is effected as a portion of a background routine executed by the EEC 100 substantially continuously during engine operation in the absence of higher priority interrupt routines. Enablement of the stepper motor driven EGR valve 150 occurs only under engine operation conditions where all of the associated hardware is operating properly. For example, the EGR valve is enabled when the engine is not in a closed throttle mode, not commanded off by torque control strategy and not in a crank mode, and the sensors 102, **106*a*, 106*b*, 159, 176** are operating in acceptable manner and generate respective signals.

Figure 2:
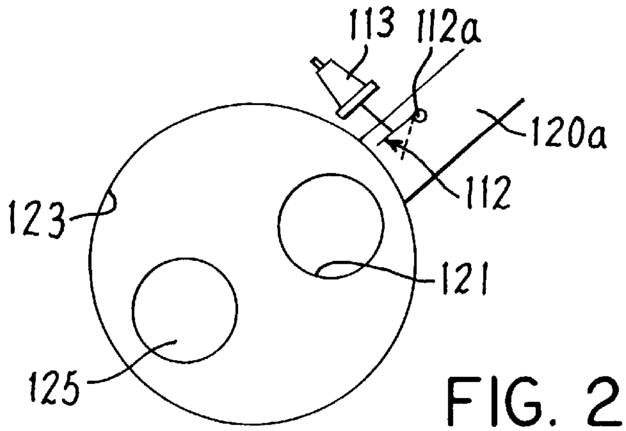
FIG. 2 is a schematic plan view of an internal combustion engine cylinder head showing a swirl control valve in an intake runner.

In accordance with an embodiment of the invention, a method and system are provided for estimating total charge to the cylinders 123 (one shown in FIG. 2) of the internal combustion engine using a total charge versus MAP function that embodies both air charge and EGR charge where the air charge and EGR charge are pounds mass per cylinder filling. For example, the total charge comprises the sum of the intake air charge (e.g. lbs. air per cylinder filling) and the EGR charge (e.g. lbs. EGR gases per cylinder filling) introduced to the manifold 120 through EGR orifice 155.

Figure 3:
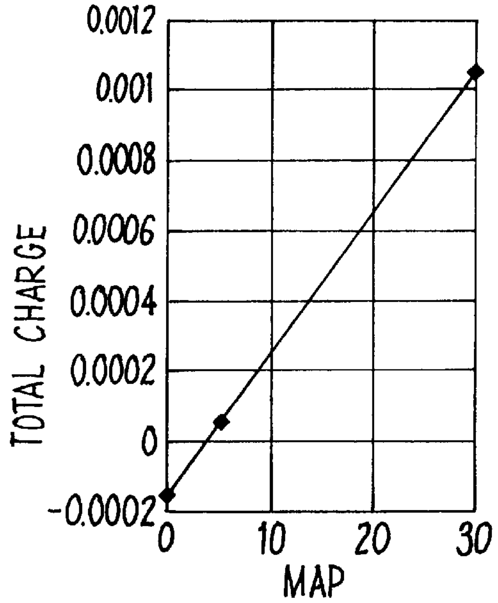
FIG. 3 illustrates MAP values on the abscissa (X-axis) and total charge values on the ordinate (Y-axis) at given engine speed.

The total charge is estimated by determining a linear total charge versus MAP reference function at various fixed engine speeds and at a preselected reference (stored) barometric pressure (e.g. bp=29.92 inches Hg), reference (stored) engine coolant temperature (e.g. ect=200 degrees F), and reference (stored) manifold air charge temperature (e.g. mct=100 degrees F). Such linear total charge versus MAP function is generated at various fixed engine speeds with the swirl control valve 112 in the closed state and open state described above. FIG. 3 illustrates a representative linear total charge versus MAP reference function represented by the equation, y=mx+b, where y is a total charge value, x is a MAP value, m is the slope of the linear function, and b is the intercept at the total charge axis (i.e. the Y-axis of FIG. 3). For purposes of illustration and not limitation, in FIG. 3, the Y-axis intercept of the linear total charge versus MAP function is shown as −0.00015 and the slope is shown as 0.00004. The linear total charge versus MAP function is determined from air charge versus MAP data with or without EGR flow from engine dynamometer testing.

Figure 4:
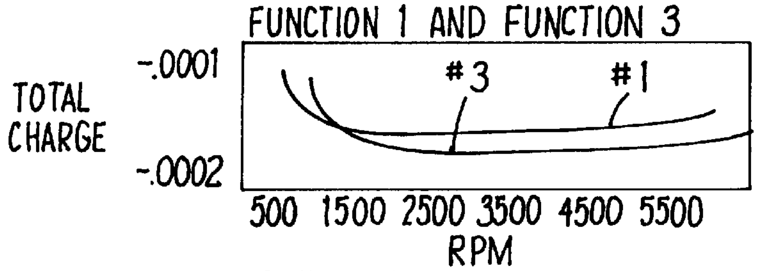
FIG. 4 illustrates Y-axis intercepts (air charge) of the total charge versus MAP function versus engine rpm for the closed and open states of a swirl control valve.
Figure 5:
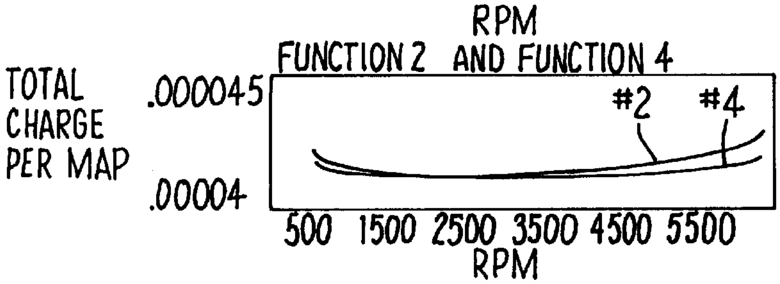
FIG. 5 illustrates slopes (air charge per MAP) of the total charge versus MAP function for engine rpm for the closed and open states of a swirl control valve.

A series of such linear total charge versus MAP reference functions are generated and stored in memory of electronic controller EEC 100 as intercept values and slope values in look up tables represented in FIGS. 4 and 5. For example, FIG. 4 represents stored intercept values, curve #1 for valve 112 open and curve #3 for valve 112 closed, at various engine speeds on the X-axis with total charge intercept values on the Y-axis. Similarly, FIG. 5 represents stored slope values, curves #2 for valve 112 open and curve #4 for valve 112 closed, at various engine speeds.

The method of the invention begins with a calculation of intercept and slope values (of the total charge versus MAP function) at a sensed engine speed with the swirl control valve 112 in the closed or open state as represented by the following control logic:

IF (swirl_control_valve='open')
THEN intercept=FUNCTION_1(engine_speed) (1)

slope=FUNCTION_2(engine_speed) (2)

ELSE intercept=FUNCTION_3(engine_speed) (3)

slope=FUNCTION_4(engine_speed) (4)

END IF

The calculated slope values are adjusted by a pulsation factor which accounts for the break down of the linear assumption of the total charge versus MAP function at very high throttle positions as detected by throttle position sensor 159. The pulsation correction factor is an empirically determined multiplier that modifies the slope values and is represented by:

pulse_factor=TABLE_B(engine_speed, pct_load) (5)

where TABLE B is a look-up table having engine speed and pct_load as inputs, where pct_load is percent of peak air flow as a ratio of current MAP divided by estimate of peak MAP at wide open throttle at current engine speed (RPM) and barometric pressure as set forth below:

TABLE B

| pct_load | | | | | |
|---|---|---|---|---|---|
| 1.00 | 1.00 | 0.98 | 1.05 | 1.04 | 1.00 |
| 0.95 | 1.00 | 0.98 | 1.04 | 1.03 | 1.00 |
| 0.90 | 1.00 | 0.99 | 1.02 | 1.01 | 1.00 |
| 0.85 | 1.00 | 1.00 | 1.00 | 1.00 | 1.00 |

TABLE B-continued

| pct_load | | | | | |
|---|---|---|---|---|---|
| 0.00 | 1.00 | 1.00 | 1.00 | 1.00 | 1.00 |
| Engine_speed | 500 | 1000 | 2000 | 3000 | 5000 |

$$\text{Where pct\_load=MAP/[bp-FNxxg(am)*29.92/bp*sqrt((act+460)/560))]} \quad (6)$$

Where MAP is manifold absolute pressure, bp is measured or estimated barometric pressure as described in U.S. Pat. No. 5,136,517, the teachings of which are incorporated herein by reference, FNxxg(am) is a measured pressure drop, PD, across the throttle and air cleaner assembly at wide open throttle at standard barometric pressure, (act+460)/560 is air charge temperature, act, on the fresh air side of the engine throttle plate corrected for deviation from a standard temperature, such as 100 degrees F (or 560 degrees Rankin), and sqrt is square root as described in copending application entitled "Exhaust Gas Recirculation System" (Attorney Docket No. 198-0297), Ser. No. 198-0297 filed Jan. 15, 1999 filed of even date herewith of common assignee, the teachings of which are incorporated herein by reference.

The Y-axis intercept of the total charge versus MAP reference function with a total charge axis (e.g. Y-axis) is adjusted for sensed barometric pressure different from the reference barometric pressure, and the slope is adjusted for sensed engine coolant temperature and sensed manifold charge temperature different from the reference engine coolant temperature value and the reference manifold charge temperature value.

In particular, since the base intercept and base slope values are characterized at a standard barometric pressure, such as 29.92 inches Hg set forth above, the intercept correction factor reflects the presence of exhaust gas residuals trapped in the clearance volume of the combustion chamber and at approximately atmospheric pressure. These residuals expand during the intake stroke to manifold pressure and displace inducted airflow. If atmospheric pressure is less than the standard, then the amount of air displaced is less as indicated a smaller Y-axis intercept value of the total charge versus MAP function.

This intercept correction factor is a multiplier calculated by:

$$\text{intercept\_cf=barometric\_pressure/29.92} \quad (7)$$

where intercept_cf is the intercept correction factor for the Y-axis intercept and barometric pressure is measured or inferred as described in U.S. Pat. No. 5,136,517, the teachings of which are incorporated herein by reference.

The slope of the total charge versus MAP function is adjusted for sensed engine coolant temperature, ect, and sensed manifold charge temperature, mct, different from the reference engine coolant temperature value and the reference manifold charge temperature value. This correction factor accounts for the charge temperature at bottom dead center of the intake stroke being different from that measured at the manifold charge temperature location (e.g. at temperature sensor 176). If this charge is higher than the standard (e.g. mct=100 degrees F), then there will be less air mass inducted than would be expected if the charge was at 100 degrees F mct. The temperature correction factor, temperature_cf, is a multiplier represented by:

$$\text{temperature\_cf=TABLE\_A(ect, mct)} \quad (8)$$

where TABLE A is a look-up table having ect values and mct values as inputs as set forth below.

TABLE A

| mct | | | | | |
|---|---|---|---|---|---|
| 250 | 1 | 1 | 1 | 0.95 | 1 |
| 200 | 0.75 | 0.85 | 0.95 | 1 | 1.05 |
| 100 | 0.8 | 0.92 | 1 | 1.1 | 1.1 |
| 0 | 0.9 | 1 | 1.05 | 1.2 | 1.2 |
| −40 | 1 | 1.05 | 1.1 | 1.25 | 1.3 |
| ect | −40 | 0 | 100 | 200 | 250 |

A slope compensation factor, slope_cf, is a multiplier determined using the temperature correction factor, temperature_cf, and an additional correction for deviation of this temperature from a standard temperature, such as 100 degrees F (or 560 degrees Rankin), for which the intercept and the slope were determined by:

$$\text{slope\_cf=temperature\_cf*(mct+460)/560} \quad (9)$$

The total charge, total charge, into the engine cylinders expressed in pounds per cylinder filling is determined by:

$$\text{total\_charge=intercept*intercept\_cf+slope*slope\_cf*pulse\_factor} \quad (10)$$

where intercept and slope are the currently determined intercept value and slope value, respectively.

This total charge value is converted to a variable, ampem, meaning air mass flow rate, am, plus EGR gas mass flow rate, em, with both expressed in mass flow units (e.g. pounds per minute) by:

$$\text{ampem=total\_charge*engine\_speed*number\_of\_cylinders/2} \quad (11)$$

The present invention thus provides a method and system for determining the total charge, ampem, to the engine cylinders where the total charge comprises air mass flow rate, am, and EGR gas mass flow rate, em, for use in controlling the stepper motor 151 of stepper motor driven EGR valve 150 in a manner to provide a desired EGR percent as described in aforementioned copending application entitled "Exhaust Gas Recirculation System" (Attorney Docket No. 198-0297).

Air mass flow rate, am, to the engine cylinders can be estimated using the ampem variable by:

$$\text{am=ampem-em} \quad (12)$$

where the em value can be estimated in a manner taught in U.S. Pat. No. 5,515,833 and copending application Ser. No. 09/005,927 filed Jan. 12, 1998, the teachings of which are incorporated herein by reference. The am value can be converted to an air charge value, air_charge, expressed in pounds per cylinder filling by:

$$\text{air\_charge=am/(engine\_speed*number\_of\_cylinders/2)} \quad (13)$$

Although the invention has been described above in connection with a swirl control valve 112 having two states; namely, the closed state or the open state, the invention is not so limited and can be practiced using a continuously variable swirl control valve 112 where the valve position in manifold runner 120*a* is continuously variable between, for example, 0 degrees (valve open) and 90 degrees (valve closed). In this embodiment, the intercept and slope equations are altered as a function of swirl control valve angle as follows:

intercept=TABLE_C(engine_speed, scv_angle) (14)

slope=TABLE_D(engine_speed, scv_angle) (15)

where scv_angle is the current angle of the swirl control valve 112 between 0 and 90 degrees and where TABLE C having intercept output values and TABLE D having slope output values are shown below.

TABLE C

| scv_angle | | | | | |
|---|---|---|---|---|---|
| 90 | −0.00014 | −0.00019 | −0.00024 | −0.00022 | −0.00019 |
| 70 | −0.00013 | −0.00018 | −0.00023 | −0.00021 | −0.00018 |
| 30 | −0.00012 | −0.00017 | −0.00022 | −0.00020 | −0.00017 |
| 15 | −0.00011 | −0.00016 | −0.00021 | −0.00019 | −0.00016 |
| 0 | −0.00010 | −0.00015 | −0.00020 | −0.00018 | −0.00015 |
| engine_speed | 500 | 1000 | 2000 | 3000 | 5000 |

TABLE D

| scv_angle | | | | | |
|---|---|---|---|---|---|
| 90 | 0.000046 | 0.000045 | 0.000044 | 0.000045 | 0.000048 |
| 70 | 0.000045 | 0.000044 | 0.000043 | 0.000044 | 0.000047 |
| 30 | 0.000044 | 0.000043 | 0.000042 | 0.000043 | 0.000046 |
| 15 | 0.000043 | 0.000042 | 0.000041 | 0.000042 | 0.000045 |
| 0 | 0.000042 | 0.000041 | 0.000040 | 0.000041 | 0.000044 |
| engine_speed | 500 | 1000 | 2000 | 3000 | 5000 |

The invention also can be practiced with a variable cam timing engine. In this embodiment, the total charge estimate is modified for a continuum of variable cam timing settings, vct_timing, where the cam timing is continuously variable between 0 degrees and 60 degrees. Variable cam timing is known and described in U.S. Pat. No. 5,609,126. In this embodiment, the intercept and slope equations are altered as a function of vct_timing as follows:

intercept=TABLE_E(engine_speed, vct_timing) (16)

slope=TABLE_F(engine speed, vct_timing) (17)

where vct_timing is the current cam timing between 0 degrees and 60 degrees, for example only, and where TABLE E having intercept output values and TABLE F having slope output values are shown below.

TABLE E

| vct_timing | | | | | |
|---|---|---|---|---|---|
| 60 | −0.00014 | −0.00019 | −0.00024 | −0.00022 | −0.00019 |
| 45 | −0.00013 | −0.00018 | −0.00023 | −0.00021 | −0.00018 |
| 30 | −0.00012 | −0.00017 | −0.00022 | −0.00020 | −0.00017 |
| 15 | −0.00011 | −0.00016 | −0.00021 | −0.00019 | −0.00016 |
| 0 | −0.00010 | −0.00015 | −0.00020 | −0.00018 | −0.00015 |
| engine_speed | 500 | 1000 | 2000 | 3000 | 5000 |

TABLE F

| vct_timing | | | | | |
|---|---|---|---|---|---|
| 60 | 0.000046 | 0.000045 | 0.000044 | 0.000045 | 0.000048 |
| 45 | 0.000045 | 0.000044 | 0.000043 | 0.000044 | 0.000047 |
| 30 | 0.000044 | 0.000043 | 0.000042 | 0.000043 | 0.000046 |
| 15 | 0.000043 | 0.000042 | 0.000041 | 0.000042 | 0.000045 |
| 0 | 0.000042 | 0.000041 | 0.000040 | 0.000041 | 0.000044 |
| engine_speed | 500 | 1000 | 2000 | 3066 | 5000 |

In the above embodiments involving continuously variable swirl control valve angle and cam timing, the intercept and slope values of the total charge versus MAP function are adjusted by the pulsation correction factor, intercept correction factor, temperature correction factor, and slope compensation factor as described above.

The invention also can be practiced to determine total charge for an internal combustion engine that does not include a swirl control valve 112. In this embodiment, the method of the invention uses the strategy described above for the swirl control valve 112 in the open state.

While the invention is described above in terms of specific embodiments, it is not intended to be limited thereto but rather only to the extent set forth in the following claims.

What is claimed is:

1. Method of estimating a total charge entering cylinders of an internal combustion engine where the total charge comprises the sum of an air charge and an EGR charge, comprising:

a) determining a linear total charge versus MAP reference function at selected engine speeds and a reference barometric pressure value, reference engine coolant temperature value, and reference manifold air charge temperature value, b) determining a current barometric pressure value, c) determining a current engine coolant temperature value, d) determining a current manifold air charge temperature value, e) adjusting an intercept of said function with a total charge axis for current barometric pressure value different from said reference barometric pressure value, f) adjusting a slope of said function for current engine coolant temperature value and current manifold air charge temperature value different from said reference engine coolant temperature value and said reference manifold air charge temperaturevalue, and g) determining an adjusted total charge at a current engine speed based on the adjusted intercept and the adjusted slope of said function.

2. The method of claim 1 further including adjusting said function above a particular throttle position of said engine by multiplying said function by a pulsation correction factor.

3. The method of claim 1 further including estimating EGR charge and subtracting said EGR charge from said adjusted total charge to estimate total air charge to said cylinders.

4. The method of claim 1 wherein said intercept and said slope are a function of at least one of a swirl control valve position and variable cam timing.

5. System for estimating a total charge entering cylinders of an internal combustion engine where the total charge comprises the sum of an air charge and an EGR charge, comprising:

a) means for determining a current barometric pressure value, b) means for determining a current engine coolant temperature value, c) means for determining a current manifold air charge temperature value, and d) an electronic engine controller programmed to store a linear total charge versus MAP charge reference function at selected engine speeds and a stored reference barometric pressure value, stored reference engine coolant temperature value, and stored reference manifold air charge temperature, to adjust an intercept of said function with a total charge axis for a current barometric pressure value different from said reference barometric pressure value, to adjust a slope of said function for a current engine coolant temperature value and a current manifold air charge temperature value different from said reference engine coolant temperature value and said reference manifold air charge temperature value, and to determine an adjusted total charge based on the adjusted intercept and the adjusted slope of said function.

6. The system of claim 5 wherein said controller stores reference intercept values and reference slope values of said total charge versus MAP reference function.

7. The system of claim 5 wherein said controller further adjusts said function above a particular throttle position of said engine by multiplying said function by a pulsation correction factor.

8. The system of claim 5 wherein said controller further estimates EGR charge and subtracts said EGR charge from said adjusted total charge to estimate total air charge to said cylinders.

9. The system of claim 8 wherein said controller further converts said total air charge to air mass flow.

* * * * *

UNITED STATES PATENT AND TRADEMARK OFFICE

CERTIFICATE OF CORRECTION

PATENT NO. : 6,115,664
DATED : September 5, 2000
INVENTOR(S) : Michael John Cullen, et al.

It is certified that error appears in the above-identified patent and that said Letters Patent is hereby corrected as shown below:

Column 9, line 38:

Change " temperaturevalve" to "temperature valve—.

Signed and Sealed this

Fifth Day of June, 2001

*Attest:*

Nicholas P. Godici

NICHOLAS P. GODICI

*Attesting Officer*

*Acting Director of the United States Patent and Trademark Office*